United States Patent [19]

Zdeblick et al.

[11] Patent Number: 5,015,850

[45] Date of Patent: May 14, 1991

[54] MICROFABRICATED MICROSCOPE ASSEMBLY

[75] Inventors: Mark J. Zdeblick, Los Altos Hills; Thomas R. Albrecht, Stanford, both of Calif.

[73] Assignee: The Board of Trustees of the Leland Stanford Junior University, Stanford, Calif.

[21] Appl. No.: 368,664

[22] Filed: Jun. 20, 1989

[51] Int. Cl.$^5$ ..................... G01N 23/00; H01J 37/00
[52] U.S. Cl. .................................... 250/306; 369/101
[58] Field of Search ...................... 250/306, 423 F; 369/101

[56] References Cited

U.S. PATENT DOCUMENTS

| | | | |
|---|---|---|---|
| 4,520,570 | 6/1985 | Bednorz et al. | 33/180 R |
| 4,668,865 | 5/1987 | Gimzewski et al. | 250/423 F |
| 4,747,698 | 5/1988 | Wickramasinghe et al. | 250/306 |
| 4,806,755 | 2/1989 | Duerig et al. | 250/306 |
| 4,831,614 | 5/1989 | Duerig et al. | 369/111 |
| 4,906,840 | 3/1990 | Zdeblick et al. | 250/306 |
| 4,945,235 | 7/1990 | Nishioka et al. | 250/306 |
| 4,947,042 | 8/1990 | Nishioka et al. | 250/306 |

OTHER PUBLICATIONS

"Squeezable Tunneling Junctions", Hansma, *IBM J. Res. Develop*, vol. 30, No. 4, Jul. 1986, pp. 370-373.

*Primary Examiner*—Bruce C. Anderson
*Attorney, Agent, or Firm*—Flehr, Hohbach, Test, Albritton & Herbert

[57] ABSTRACT

A microfabricated microscope assembly including a piezoelectric bimorph cantilever arm mounted at one end to a first substrate. The free end of the canitlever arm has a tip mounted thereto for scanning a scanned surface mounted on a second substrate. The cantilever arm and the substrate are configured to carry out a predetermined write or read mode of operation, such as scanning tunneling microscopy or atomic force microscopy. The two substrates are spaced apart a fixed distance by spacer feet which project from one of the substrates and which have their ends fixed to ther surface of the other substrate by eutectic, aniodic, or adhesive bonding. An array of microfabricated microscope assemblies is formed using a plurality of individual assemblies. A number of different write/read modes of operation are accommodated, such as charge storage, molecular attachment, or magnetic domains. An array of piezoelectric cantilever arms having tips fixed to the free ends thereof and mounted to a substrate form are used to scan a scanned surface. The array is moved laterally with respect to the scanned surface using mechanical actuators as micropositioners for coarse positioning and using the piezoelectric cantilever arms for fine positioning.

31 Claims, 5 Drawing Sheets

MICROFABRICATED MICROSCOPE ASSEMBLY

The U.S. Government has paid up license under this invention and the right in limited circumstances to require the patent owner to license others on reasonable terms as provided for by the terms of Contract No. 00014-884-K-0624 awarded by the Department of the Navy.

BACKGROUND OF THE INVENTION

1. Field of the Invention

This invention relates to microminiature scanning microscopes, such as tunneling microscopes (STMs) and atomic force microscopes, and, more particularly, to microfabricated microscope structures which incorporate a surface to be scanned and a cantilever arm having a scanning tip at the end thereof.

2. Prior Art

Previously, surfaces to be scanned by a STM were positioned opposite the scanning tip by use of precision mechanical adjustment mechanisms.

In a paper entitled "SCANNING TUNNELING MICROSCOPY" by Binnig and Rohrer, the *IBM Journal of Research and Development*, Vol. 30, No. 4, pages 355-369, July 1986, a scanning tunneling microscope is depicted in FIG. 2 using a piezoelectric tripod. This tripod consists of 3 piezoelectric rods of material joined at a junction; each rod expands and contracts along one of 3 Cartesian coordinate axes. The tip is mounted at the junction of the 3 rods. The tip is brought into proximity of the surface by a rough positioner. Thereafter the piezoelectric tripods are used to scan the tip across the surface to develop an image of that surface.

Such an arrangement is limited in its application because of its relatively great size, making it subject to vibration and thermal drift.

U.S. Patent Application Ser. No. 149,236, filed Jan. 27, 1988, and assigned to the assignee of the present invention describes a microminiature cantilever arm which has a scanning tip mounted at the free end thereof. The cantilever arm is deflected to position the scanning tip with respect to a surface to be scanned. The cantilever is fabricated by integrated circuit fabrication techniques. The cantilever arm is deflected with respect to the surface to be scanned by an actuating mechanism, which is formed by alternating layers of piezoelectric material and conductive layers. The conductive layers can be individually addressed to enable the cantilever arm to move in three independent directions to thereby appropriately position the scanning tip with respect to a surface to be scanned.

SUMMARY OF THE INVENTION

It is therefore an object of the invention to provide a scanning tunneling microscope assembly which is microfabricated and incorporates the surface to be scanned within the assembly.

It is another object of the invention to provide a mass memory using an array of a number of microfabricated piezoelectric cantilever arms mounted on a single substrate.

It is another object of the invention to provide an array of piezoelectric cantilever arms with scanning tips on the ends thereof to scan a surface.

It is another object of the invention to provide a microfabricated microscope assembly which is adaptable to a variety of operational modes, such as scanning tunneling microscopy, atomic force microscopy, and other modes of operation.

In accordance with these and other objects of the invention, a microfabricated microscope assembly is provided which includes a piezoelectric bimorph cantilever arm which is mounted to a substrate and which has a free end with a scanning tip fixed thereto. A scanned surface fixed to a second substrate is provided with the cantilever arm tip and the scanned surface being configured to carry out a predetermined write or read operation. The two substrates are spaced apart a fixed distance so that the tip is positioned in close proximity to the scanned surface. In one embodiment of the invention, a plurality of spacer feet are used with the height of the spacer feet determining the spacing distance between the substrates. The spacer feet project from one of the substrates and the end surfaces of the spacer feet are bonded to the surface of the other substrate. Bonding is accomplished, for example, by eutectic bonding, anodic bonding, or adhesive bonding.

An array of microfabricated microscope assemblies is formed with a plurality of such assemblies.

Electrical connections are provided between the two substrates using contact pads.

Various predetermined write or read modes of operation are used including storage and retrieval of information in the form of: stored charge; molecules attached to the scanned surface; markings on the scanned surface; contamination resist; marking of metallic glass; and magnetic domains in the scanned surface. The piezoelectric cantilever arm and the scanned surface are combined to operate in a number of different microscope modes including: scanning tunneling, atomic force, magnetic force, capacitive force, and scanning thermal modes.

According to another aspect of the invention, an array of scanning cantilever arm assemblies is provided which includes an array of a plurality of piezoelectric bimorph cantilever arms arranged on a substrate. The array is positioned coarsely with respect to a scanned surface using, for example, mechanical actuators.

BRIEF DESCRIPTION OF THE DRAWINGS

The accompanying drawings, which are incorporated in and form part of this specification, illustrate embodiments of the invention and, together with the description, serve to explain the principles of the invention.

DETAILED DESCRIPTION OF THE PREFERRED EMBODIMENTS

Reference will not be made in detail to the preferred embodiments of the present invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1A:
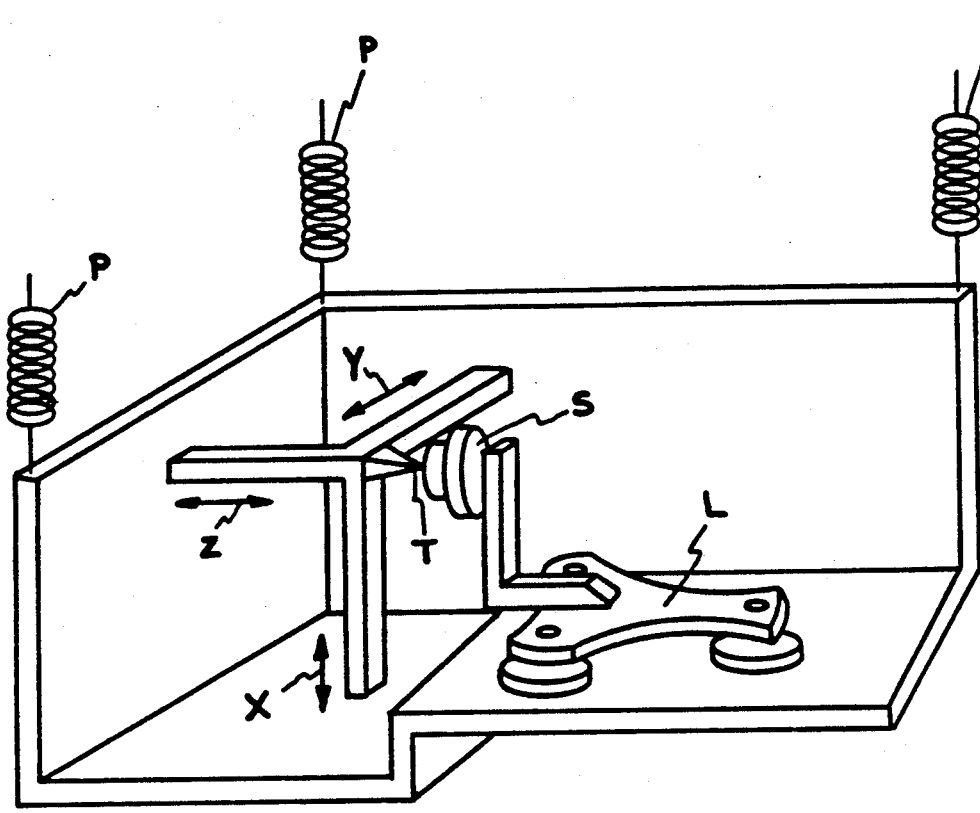
FIG. 1A is a perspective view of a prior art piezoelectric tripod for positioning a tip with respect to a substrate.
Figure 1B:
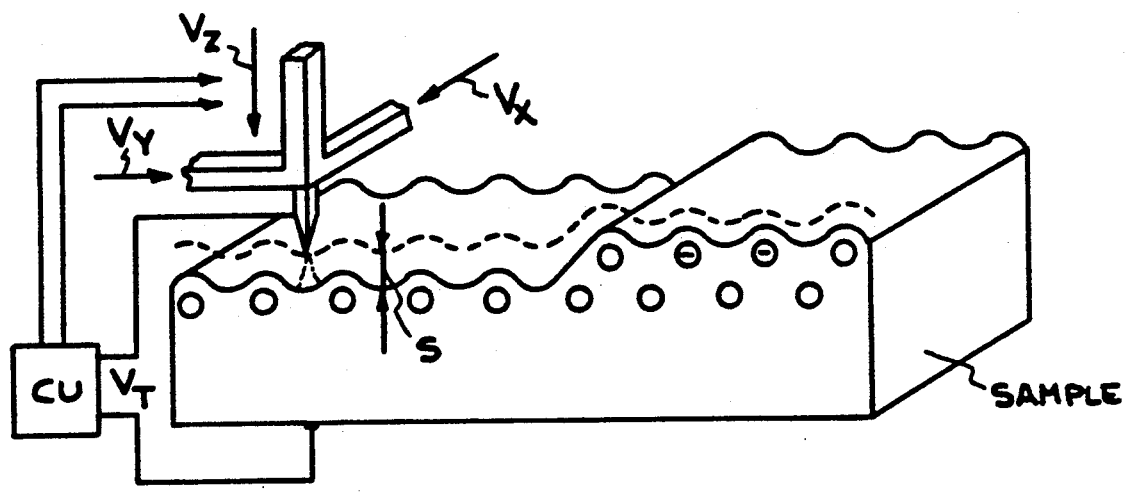
FIG. 1B is a perspective, diagrammatic view of the tripod scanning across the surface of a sample.

FIG. 1A shows the mechanical details of the typical scanning tunneling microscope prior art structure as developed by IBM and as discussed in the above cited *IBM Journal of Research and Development*. The microscope tip T is scanned over the surface of a sample S with a piezoelectric tripod (X, Y, Z) in FIG. 1B. A rough positioner L brings the sample within reach of the tripod. A vibration filter system P protects the instrument from external vibrations. In the constant tunneling current mode of operation, the voltage $v_Z$ is applied to the Z piezoelectric element by means of the control unit CU depicted in FIG. 1B. The control unit keeps the tunneling current constant. The tip is scanned across the surface by altering the control voltages $V_X$ and $V_Y$. The trace of the tip generally resembles the surface topography. Inhomogeneities in the electronic structure of the sample's surface also produce structure in the tip trace. This is illustrated on the right half of the sample S as two surface atoms which have excess negative charge.

Figure 2A:
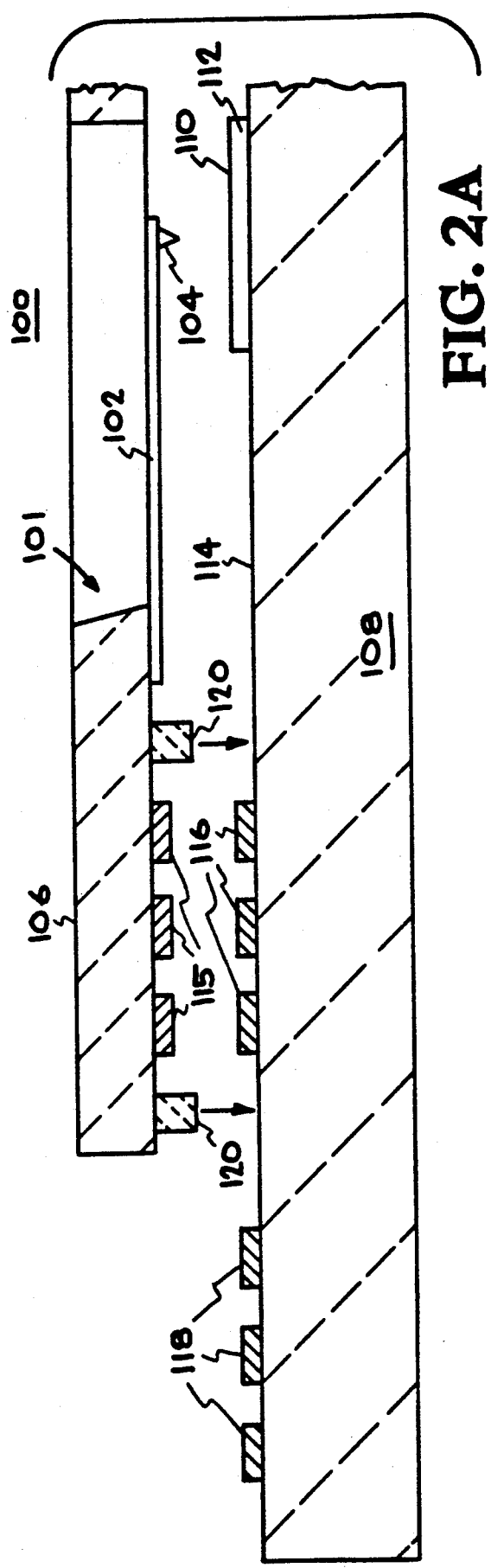
FIG. 2A is a sectional view of an integrated STM assembly, including a surface to be scanned, with the elements spaced apart.
Figure 2B:
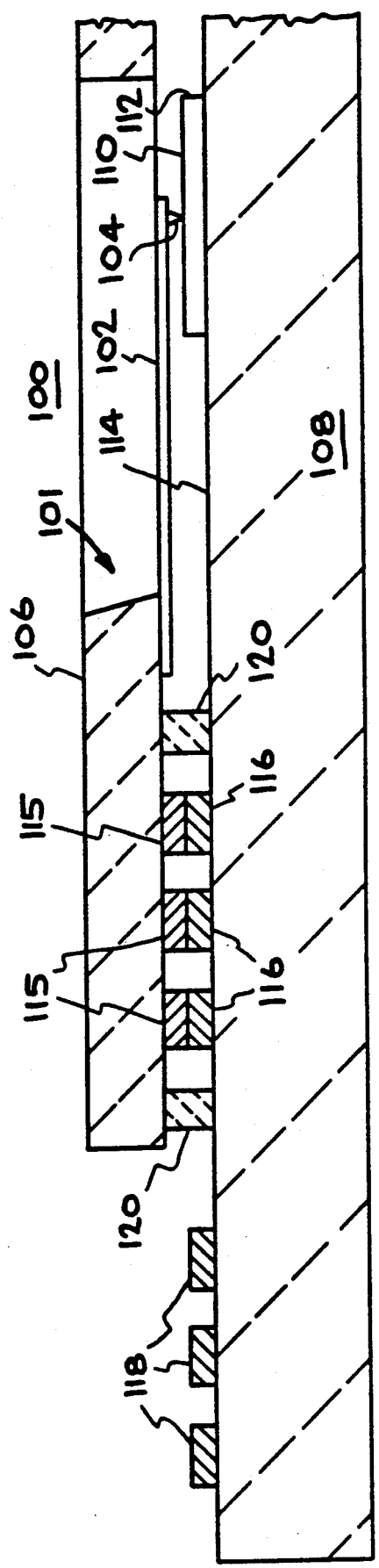
FIG. 2B is an assembled view of the elements of FIG. 2A.

FIG. 2A shows an STM assembly 100 with the elements spaced apart prior to attachment of the elements. FIG. 2B shows the elements attached. The STM assembly 100 includes a cantilever arm assembly 101 including a piezo-electric bimorph cantilever arm 102 formed, for example, in accordance with U.S. Patent Application Ser. No. 149,236, filed Jan. 27, 1988. Fixed to the free end of the cantilever arm 102 is a conductive tip 104. The other end of the cantilever arm 102 is fixed to a portion of a first silicon substrate 106, which has served as the base on which the cantilever arm 102 and the tip 104 were formed using semiconductor integrated circuit fabrication techniques. A portion of a second substrate 108 serves as a base for the entire STM assembly 100. The second substrate is formed of a suitable material such as silicon or pyrex glass. A memory surface 110, also referred to as a scanned surface, is provided as the surface of a layer 112 of material fixed to the surface 114 of the second substrate 108. The memory surface 110 is formed from a metal, semi-metal, or semiconductor material, and may also include a thin external film of oxide.

The cantilever arm assembly 101 and the second substrate 108 each have a number of contact pads 115,116 formed on their respective surfaces. Contact pads 115 on the cantilever arm assembly 101 are connected to various conductors on the cantilever arm assembly. The contact pads 116 on the second substrate 108 are connected to external bonding pads 118 formed, for example, of aluminum or gold to which wires are connected by conventional wirebonding techniques to make connections to external circuits.

In operation, voltage signals are applied to the conductors on the piezoelectric cantilever arm 102 to move the tip such that it is spaced at or in close proximity to the memory surface 110 so that tunneling occurs. Information stored in the memory surface is then written into and read from the memory surface 110.

Several techniques are provided by the invention for attachment of the cantilever arm assembly 101 to the second semiconductor substrate 108. These include eutectic bonding, anodic bonding and glue bonding, each of which is described hereinbelow.

For eutectic bonding, the contact pads 115,116 are formed of two dissimilar metals, such as, for example, copper and tin, which form a eutectic bond when heated above a certain temperature. The second substrate 108 is made of a suitable material, such as silicon or pyrex glass. On it are deposited by conventional techniques the layer 112 having the memory surface 110, the contact pads 116, the external bonding pads 118, and any other circuits or interconnections. The contact pads 115 on the cantilever arm assembly 101 are located to register with and to contact corresponding contact pads 116 on the second substrate 108 when the cantilever arm assembly 101 is brought into contact with the second substrate 108. Heat is applied and the dissimilar metals of the respective contact pad pairs 115,116 form eutectic bonds at their adjacent top surfaces. These bonds provide the means for attachment of the cantilever arm assembly 101 to the substrate 108. These bonds also provide for electrical connections to the cantilever arm assembly 101.

The final spacing between the cantilever arm assembly 101 and the surface 114 of the substrate 108 is provided by spacer feet 120, which are formed, for example, by deposition techniques or other suitable techniques on the lower surface of the silicon substrate 106. The materials for the spacer feet 120 are chosen from a group of materials, such as silicon or various metals, which are not affected by the temperature used to eutectically bond the two halves of the complete assembly together. The height of the spacer feet 120 is set at a predetermined distance so that the tip 104 at the end of the cantilever arm 102 can be positioned by the piezoelectric cantilever arm in sufficiently close proximity to the scanning surface 110 to scan that surface.

For anodic bonding, the spacer feet 120 are bonded to the surface 114 of the second substrate 108 by an anodic process. The spacer feet are formed, for example, of silicon and the second substrate of a suitable glass material, such as pyrex glass. An anodic junction is formed by application of slight pressure, heat, and an electric field at the silicon/glass junction. In this technique, the contact pads 115,116 are formed of a material, such as gold, which is sufficiently ductile so that the contacts pads can be compressed to permit the spacer feet 120 to contact the surface 114 of the second substrate 108. As in the eutectic process, the spacing between the cantilever arm assembly 101 and the second substrate 108 is determined by the height of the spacer feet 120. Note that the spacer feet alternatively can be formed on the surface of the substrate 108. Several methods are available for forming spacer feet 120 on the lower surface of the cantilever arm assembly 106. One method is to deposit and pattern the spacer feet, for example, by a lift-off process after the piezoelectric cantilever arm 102 and tip 104 have fabricated. Another method of forming the spacer feet 120 spacer feet 120 protruding therefrom. This is done, for example, by dry etching the silicon substrate 106 to a suitable depth with a suitable silicon nitride mask on the ends of the spacer feet 120 prior to fabrication of the cantilever arm assembly 101 on the silicon substrate 106.

For glue, or adhesive, bonding, the first substrate 106 and the second substrate 108 do not need to be formed of particular materials. An adhesive is screen printed by conventional techniques on either the ends of the spacer feet 120 or at appropriate locations on the surface 114 of the second substrate 108. To assemble the STM assembly 100, the cantilever arm assembly 101 and the substrate 108 are aligned and the ends of the spacer feet 120 are brought into contact with the adhesive on the surface 114 of the substrate 108 to form an adhesive mechanical bond. Electrical connections are provided by contact between the corresponding contact pads 115,116 which are compressed together. Spacing between the cantilever arm assembly 101 and the substrate 108 is set to a predetermined distance by the height of the spacer feet 120.

Figure 3:
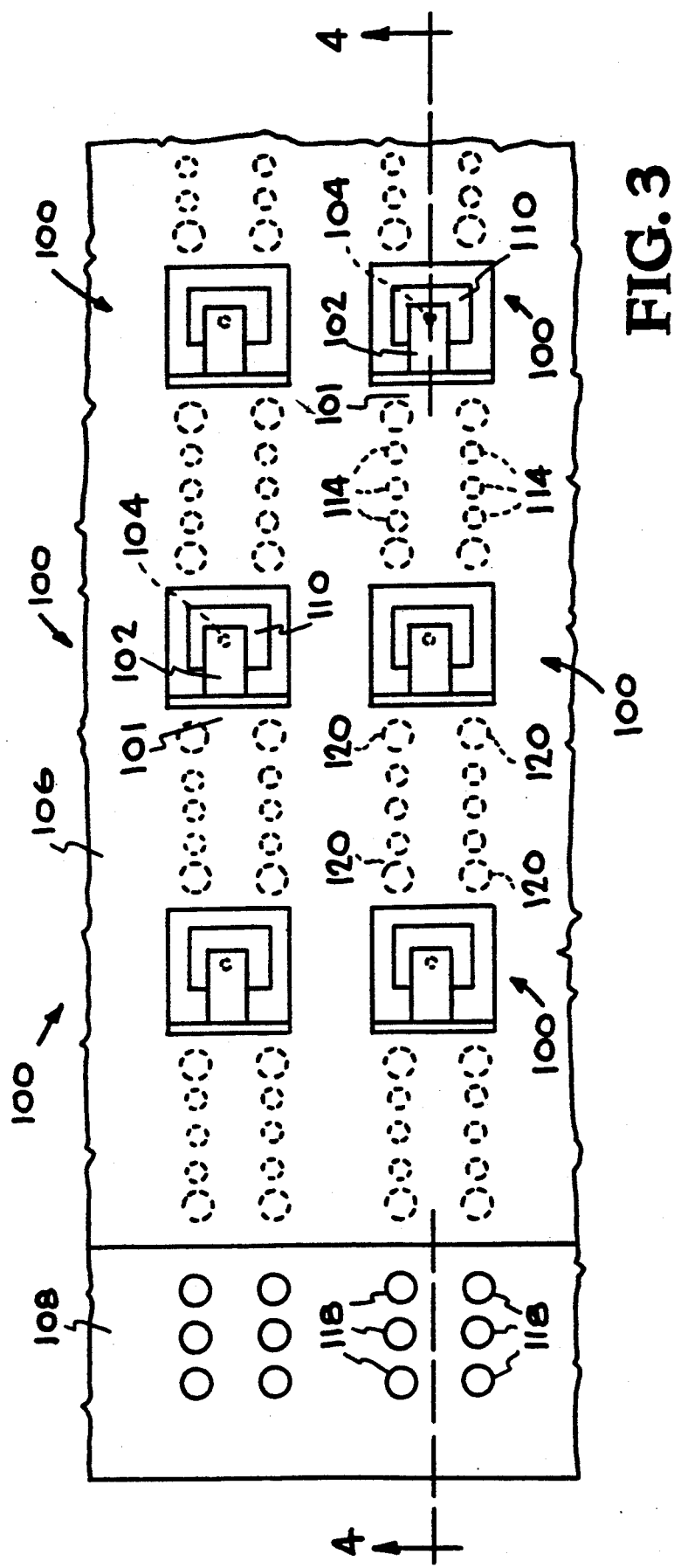
FIG. 3 is a plan view of an array of integrated STM assemblies.
Figure 4:
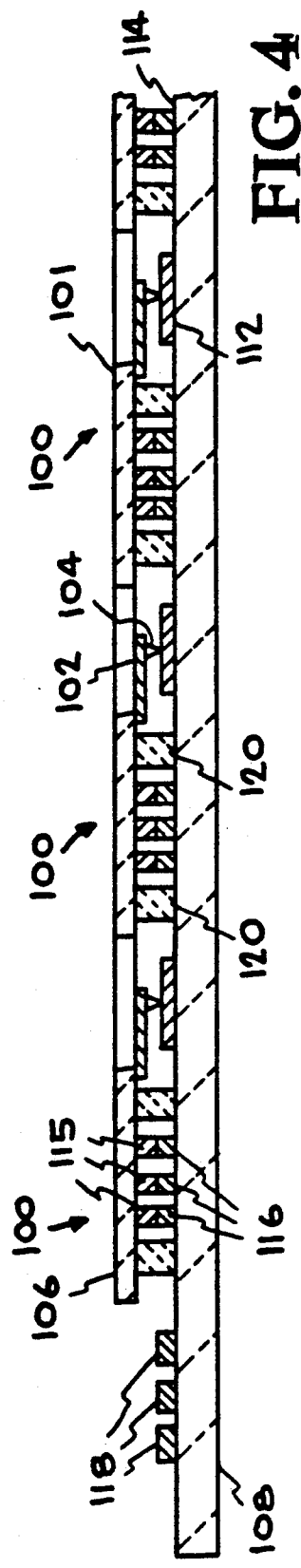
FIG. 4 is a sectional view taken along section line 4—4 of FIG. 3 of the array of integrated STM assemblies.

FIG. 3 shows a plan view of an array of STM assemblies 100 where the same reference numerals are used to indicate that the STM assemblies have structures very similar to that shown in FIG. 2A and FIG. 28. FIG. 4 shows a sectional view of the array. This type of array is used for a large-capacity memory device which is fabricated using conventional semiconductor integrated circuit fabrication techniques. Any of the previously described bonding techniques is used to provide mechanical attachment of the cantilever arm assemblies 101 to the substrate 108. Each cantilever arm assembly 101 is formed in a portion of a single silicon substrate 106, as described hereinabove, using batch techniques.

FIG. 4 shows that a number of scanned surfaces 110 are formed on the surface 114 of the substrate 108. Each of these surfaces 110 is individually scanned by a tip 104 of a cantilever arm 102. Electrical connections to an individual STM assembly 100 are made using corresponding pairs of the contact pads 115,116, as described previously. External connections to all of the circuits on the substrate 108 are made with the appropriate bonding pads 118 near the edge of the substrate 108. Alternatively, electrical connections are made with suitable bonding pads on the silicon substrate 106. Spacing between the substrates 106,108 is set by the height of the spacer feet 120 as described previously.

Figure 5:
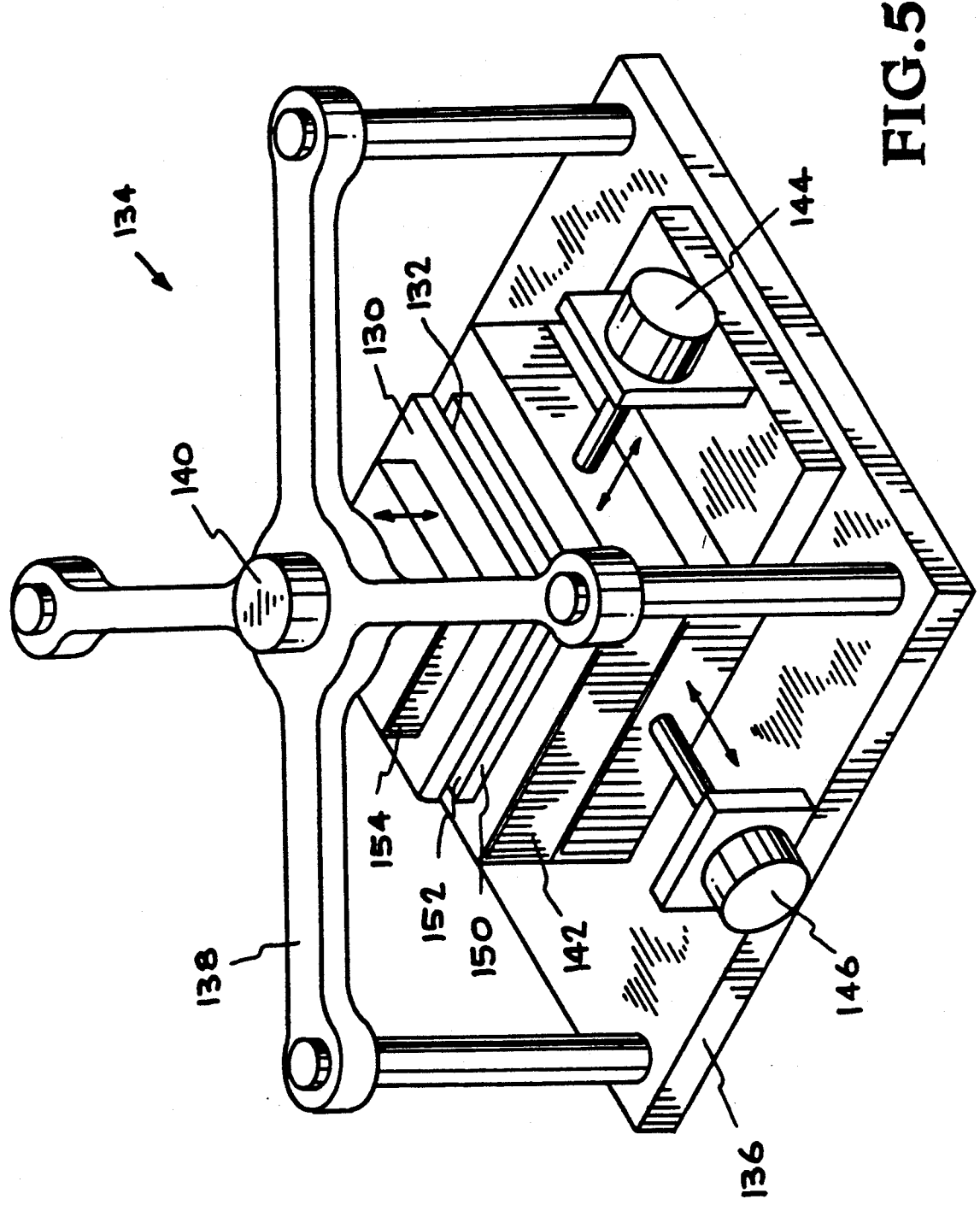
FIG. 5 is a perspective view of an array of STM assemblies on a mechanical scanner assembly.

FIG. 5 shows a substrate 130 on the lower surface of which is provided an array 132 of cantilever arm assemblies 101 described hereinabove. The substrate 130 is mounted on a mechanical positioner assembly 134. The mechanical positioner assembly 134 includes a fixed bottom plate 136 and a fixed top frame 138. The substrate 130 is mounted to a vertical axis block 154 which is attached to a vertical-motion actuator 140 mounted to the fixed top frame 138. A sample device 150 is mounted to a short-range horizontal, or x-y, mechanical platform which includes a mounting block 142 on which a sample device 150 is mounted. The mounting block 142 is moved horizontally in the X-direction by an X-direction horizontal actuator 144 and in the Y-direction by a Y-direction horizontal actuator 146. The surface 152 of the sample device 150 is to be scanned by the array 132 of cantilever arm assemblies 101 mounted on the lower surface of the substrate 130. The X-direction and the Y-direction horizontal actuators 144,146 each have a range of motion of approximately one millimeter.

Figure 6:
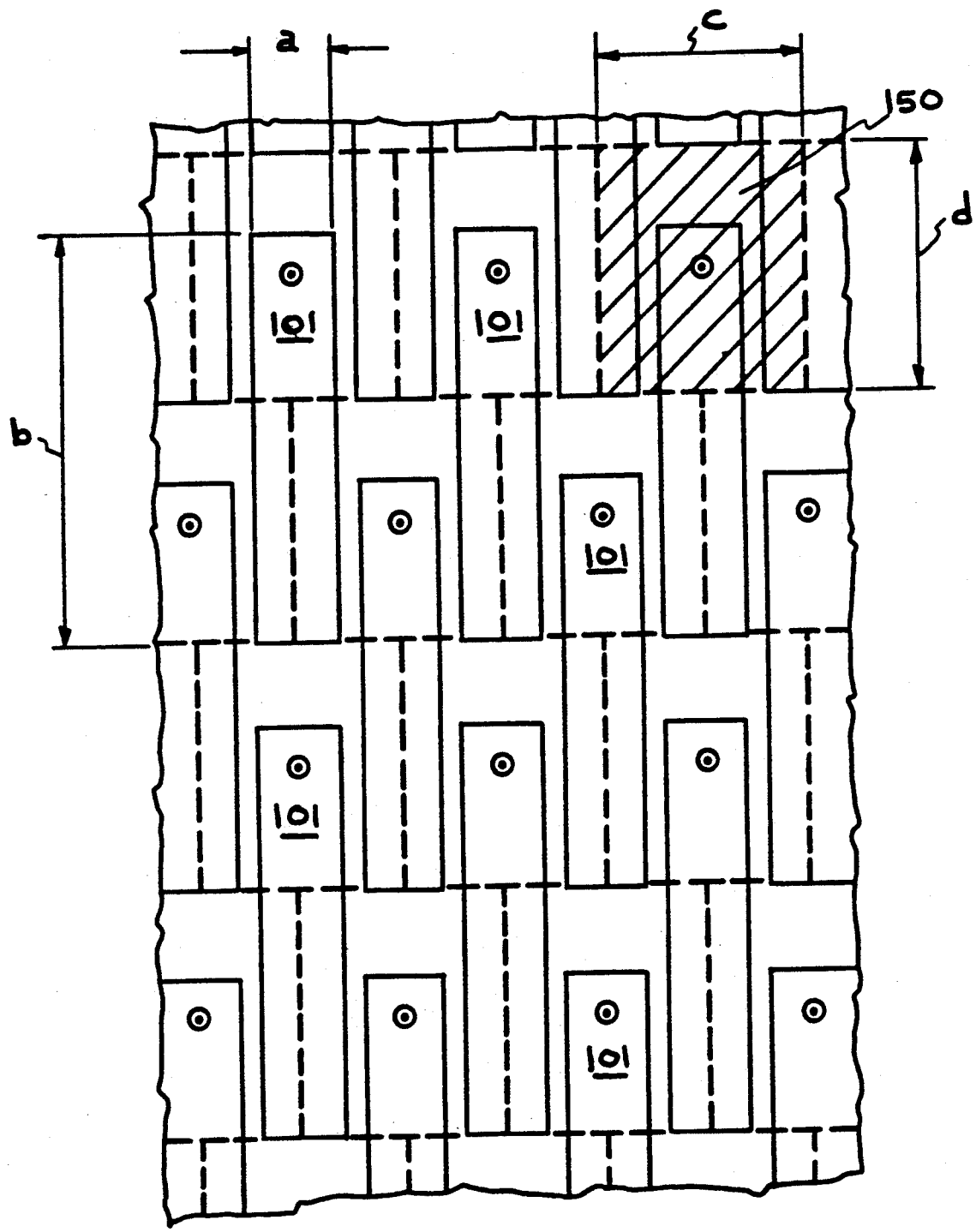
FIG. 6 is a partial plan view of the array of STM assemblies of FIG. 5.

FIG. 6 shows a partial plan view of some of the cantilever arm assemblies 101 located on the lower surface of the substrate 130. For a cantilever arm assembly having a dimension "a" equal to 200 microns and a dimension "b" equal to 1000 microns, a closely packed array of cantilever arm assemblies 101 is provided as shown. The horizontal actuators 144,146 move the cantilever arm tips over a range as shown by dimensions "c" and "d", which are approximately 500 and 600 microns. Thus, the entire surface area of the sample device 150 (as typically indicated by the cross hatched area) can be scanned with a short-range mechanical scanner arrangement such as described above used for relatively coarse positioning with accuracy in the range of hundreds of Angstroms. A set of long piezoelectric tubes such as described in the Binnig and Smith reference provide sufficient scanning range for the short-range mechanical scanner. Using sufficiently long piezoelectric tube allows motions as great as a millimeter. Various other types of mechanical scanners can also be used, such as magnetic or mechanical screw types. The very fine-scale scanning is done using the piezoelectric cantilever arm to accurately position the tips.

There are a number of applications for the invention. A microfabricated microscope assembly according to the invention could be used as an "array microscope" for simultaneously imaging large surfaces, such as silicon wafers, using parallel scanning tunnelling microscope configurations. A second application in large-area lithography using parallel scanning tunneling microscopes. A third application is for storage of data in a large-scale memory configuration provided by scanning the entire surface of a substrate.

Information is stored on the substrate in a number of ways:

Molecular attachment of molecules to the memory surface is described in a paper by Foster et al entitled "Molecular Manipulation Using A Tunneling Microscope," Nature 331, 324 (1988).

Marking of gold is described by Sonnefeld et al. in a paper entitled "Scanning Tunneling Microscopy and Atomic Force Microscopy of the Liquid-Solid Interface," J. Vac. Sci. Technol. A 6, 283 (1988).

Jaklevic et al. in a paper entitled "Scanning-Tunneling-Microscope Observation of Surface Diffusion on an Atomic Scale: Au on Au (111)", Phys. Rev. Lett. 60, 120 (1988).

Emch et al. in a paper entitled "Characterization of Gold Surfaces for Use a Substrates in Scanning Tunneling Microscopy Studies," J. Appl. Phy. 79 (1989).

Contamination resist, a technique having some similarity to molecular attachment is described by McCord and Pease in a paper entitled "Lithography With the Scanning Tunneling Microscope," J. Vac. Sci. Technol. B 4, 86 (1986).

De Lozanbne et al. in a paper entitled "Direct Writing of 10 nm Features with the Scanning Tunneling Microscope," Appl. Phys. Lett. 53, 2287 (1988).

Storage of charge either at the surface of an insulating layer or charge stored by tunneling into a dielectric layer use charge to store information.

Marking of metallic glass is described in a paper by Stauffer et al. entitled "Nanometer Scale Structure Fabrication With the Scanning Tunneling Microscope," Appl. Phys. Lett. 51, 244 (1987).

Deposition of organo-metallic gases is described in a paper by De Lozanne et al. entitled "Direct Writing of Submicron Metallic Features with a Scanning Tunneling Microscope," Apl. Phys. Lett. 51, 247 (1987).

Magnetic methods using magnetic domains to store information are also useful.

Formation of holes as described by T. R. Albrecht et al. entitled "Nanometer-Scale Hole Formation on Graphite Using A Scanning Tunneling Microscope," submitted to Appl. Phys. Lett. (1989).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A microfabricated microscope assembly, comprising:
   a piezoelectric bimorph cantilever arm having a first end fixed to said first substrate, said cantilever arm having a second free end with a tip fixed thereto;
   a second substrate;
   a scanned surface fixed to said second substrate and having various locations to be scanned by said tip, said tip and said scanned surface being configured to carry out a predetermined write or read mode of operation;
   spacer means fixed between said first and said second substrates for fixedly spacing said first and said second substrates a predetermined distance apart so that said tip is in close proximity to said recording surface, said spacer means including a plurality of spacer feet projecting between said first and said second substrates, the height of said spacer feet determining the spacing between said first and said second substrate, wherein said spacer feet have end surfaces at the ends thereof and wherein said microfabricated microscope assembly includes means for bonding the end surfaces of said spacer feet to one of said substrates;
   means for directly controlling the piezoelectric bimorph cantilever arm to scan said tip laterally over the scanned surface to access various locations on said scanned surface and to move the tip with respect to the scanned surface such that the tip is spaced at or in close proximity to said scanned surface.

2. The microfabricated microscope assembly of claim 1 wherein the means for bonding includes means for forming eutectic bonds.

3. The microfabricated microscope assembly of claim 1 wherein the means for bonding includes means for forming anodic bonds.

4. The microfabricated microscope assembly of claim 1 wherein the means for bonding includes means for forming adhesive bonds.

5. The microfabricated microscope assembly of claim 1 including a plurality of microfabricated microscope assemblies formed as an array of such assemblies between said first and a second substrates.

6. The microfabricated microscope assembly of claim 1 including means for providing electrical connections between conductors formed on the first and the second substrates.

7. The microfabricated microscope assembly of claim 6 wherein said means for providing electrical connections includes respective contact pads formed on said substrates and arranged to contact each other when the two substrates are spaced apart by said spacer means.

8. The microfabricated microscope assembly of claim 1 wherein said predetermined operation includes storage and of information in the form of stored charge.

9. The microfabricated microscope assembly of claim 1 wherein said predetermined operation includes storage and retrieval of information in the form of molecules attached to the scanned surface.

10. The microfabricated microscope assembly of claim 1 said predetermined operation includes storage and retrieval of information in the form of markings on said scanned surface.

11. The microfabricated microscope assembly of claim 1 wherein said predetermined operation includes storage and retrieval of information stored by contamination resist.

12. The microfabricated microscope assembly of claim 1 wherein said predetermined operation includes storage and retrieval of information stored by marking metallic glass.

13. The microfabricated microscope assembly of claim 1 wherein said predetermined operation includes storage and retrieval of information using magnetic domains on said scanned surface.

14. The microfabricated microscope assembly of claim 1 wherein said cantilever arm with its tip and the scanned surface are operated in a scanning tunneling microscope mode of operation.

15. The microfabricated microscope assembly of claim 1 wherein said cantilever arm with its tip and the scanned surface are operated in an atomic force microscope mode of operation.

16. microfabricated microscope assembly of claim 1 wherein said cantilever arm with its tip and the scanned surface are operated in a magnetic force microscope mode of operation.

17. The microfabricated microscope assembly of claim 1 wherein said cantilever arm with its tip and the scanned surface are operated in a capacitive force microscope mode of operation.

18. The microfabricated microscope assembly of claim 1 wherein said cantilever arm with its tip and the scanned surface are operated in a scanning thermal microscope mode of operation.

19. An array of scanning microfabricated cantilever arm assemblies, comprising:
   a first substrate;
   an array of a plurality of piezoelectric bimorph cantilever arms arranged in a laterally extending array on said first substrate, each of said cantilever arms having a first end fixed to said first substrate and each of said cantilever arms having a second free end with a tip fixed thereto, each of said tips and said scanned surface being configured to carry out a predetermined write or read mode of operation;
   a scanned surface having various locations to be scanned by said tips wherein said tips and said scanned surface are configured to carry out a predetermined write or read operation;
   means for positioning said first substrate with respect to said scanned surface including means for laterally moving the array of piezoelectric cantilever arms with respect to said scanned surface to provide coarse positioning of the cantilever arm tips with respect to the scanned surface, said piezoelectric cantilever arm moving the tip to provide fine positioning of the tips with respect to the scanned surface.

20. The array of claim 19 wherein said means for positioning and laterally moving the array of piezoelectric cantilever arms includes mechanical actuators for micropositioning said first substrate with respect to said scanned surface.

21. The array of claim 20 wherein said predetermined operation includes storage and retrieval of information in the form of stored charge.

22. The array of claim 20 wherein said predetermined operation includes storage and retrieval of information in the form of molecules attached to the scanned surface.

23. The array of claim 20 wherein said predetermined operation includes storage and retrieval of information in the form of by markings on said scanned surface.

24. The array of claim 20 wherein said predetermined operation includes storage and retrieval of information stored by contamination resist.

25. The array of claim 20 wherein said predetermined operation includes storage and retrieval of information stores by marking metallic glass.

26. The array of claim 20 wherein said predetermined operation includes storage and retrieval of information using magnetic domains on said scanned surface.

27. The array of claim 20 wherein said cantilever arms with their tips and the scanned surface are operated in a scanning tunneling microscope mode of operation.

28. The array of claim 20 wherein said cantilever arms with their tips and the scanned surface are operated in an atomic force microscope mode of operation.

29. The array of claim 20 wherein said cantilever arms with their tips and the scanned surface are operated in a magnetic force microscope mode of operation.

30. The array of claim 20 wherein said cantilever arms with their tips and the scanned surface are operated in a capacitive force microscope mode of operation.

31. The array of claim 20 wherein said cantilever arms with their tips and the scanned surface are operated in a scanning thermal microscope mode of operation.

* * * * *